(12) United States Patent
Kitayama et al.

(10) Patent No.: US 9,874,250 B2
(45) Date of Patent: Jan. 23, 2018

(54) ROTATION TRANSMISSION DEVICE

(71) Applicant: NTN CORPORATION, Osaka (JP)

(72) Inventors: Naotsugu Kitayama, Shizuoka (JP); Shintaro Ishikawa, Shizuoka (JP); Koji Sato, Shizuoka (JP); Takahide Saito, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/116,571

(22) PCT Filed: Feb. 2, 2015

(86) PCT No.: PCT/JP2015/052830
§ 371 (c)(1),
(2) Date: Aug. 4, 2016

(87) PCT Pub. No.: WO2015/119074
PCT Pub. Date: Aug. 13, 2015

(65) Prior Publication Data
US 2016/0348740 A1    Dec. 1, 2016

(30) Foreign Application Priority Data
Feb. 4, 2014    (JP) ................................. 2014-019027

(51) Int. Cl.
| F16D 27/108 | (2006.01) |
| F16D 41/067 | (2006.01) |
| F16D 41/066 | (2006.01) |
| F16D 41/08 | (2006.01) |
| F16D 23/12 | (2006.01) |

(52) U.S. Cl.
CPC ......... F16D 27/108 (2013.01); F16D 41/066 (2013.01); F16D 41/067 (2013.01); F16D 41/088 (2013.01); F16D 2023/123 (2013.01)

(58) Field of Classification Search
CPC ..................................................... F16D 27/108
See application file for complete search history.

(56) References Cited

U.S. PATENT DOCUMENTS 2,273,646 A    2/1942    Johnson

FOREIGN PATENT DOCUMENTS

| JP | 2009-287724 | 12/2009 |
| JP | 2013-145045 | 7/2013 |
| JP | 2013-199993 | 10/2013 |

OTHER PUBLICATIONS

English translation of International Preliminary Report on Patentability and Written Opinion of the Searching Authority dated Aug. 9, 2016 in International (PCT) Application No. PCT/JP2015/052830.

*Primary Examiner* — Mark A Manley
(74) *Attorney, Agent, or Firm* — Wenderoth, Lind & Ponack, L.L.P.

(57) ABSTRACT

A rotation transmission device includes an electromagnetic clutch which selectively engages and disengages a two-way clutch configured to selectively perform and stop transmission of torque between an input shaft and an output shaft. A spring holder fitted on the input shaft prevents rollers from axially moving. Spring holding pieces mounted to the spring holder are formed with respective engagement surfaces engaging with cam surfaces of an outer periphery of an inner ring such that the spring holder is rotationally fixed.

4 Claims, 8 Drawing Sheets

ROTATION TRANSMISSION DEVICE

TECHNICAL FIELD

The present invention relates to a rotation transmission device capable of selectively performing and stopping the transmission of rotation.

BACKGROUND ART

As rotation transmission devices configured to selectively perform and stop the transmission of the rotation of an input shaft to an output shaft, rotation transmission devices are known which include a two-way clutch configured to connect the input and output shafts to each other and disconnect the input and output shafts from each other, and an electromagnetic clutch configured to selectively engage and disengage the two-way clutch.

Japanese Unexamined Patent Application Publication No. 2013-199993 discloses a rotation transmission device including an outer ring, an inner ring provided inside of the outer ring, a control retainer and a rotary retainer which are provided between the outer ring and the inner ring such that pillars of the control retainer circumferentially alternate with pillars of the rotary retainer, opposed pairs of rollers received in pockets defined between adjacent ones of the pillars of the control retainer and the pillars of the rotary retainer, and elastic members received between the respective opposed pairs of rollers. Each opposed pair of rollers are biased away from each other by the elastic member so as to be kept at the standby position at which the pair of rollers engage with a cylindrical surface formed on the inner periphery of the outer ring and one of cam surfaces formed on the outer periphery of the inner ring, and when the inner ring rotates in one direction, one of each opposed pair of rollers engages with the cylindrical surface and one of the cam surfaces, thereby transmitting the rotation of the inner ring to the outer ring.

The rotation transmission device of Japanese Unexamined Patent Application Publication No. 2013-199993 further includes an input shaft to which the inner ring is mounted, and an electromagnetic clutch having an electromagnetic coil, and being provided on the input shaft. When the electromagnetic coil of the electromagnetic clutch is energized and thus the control retainer axially moves, due to a torque cam (motion converting mechanism) provided between the opposed surfaces of a flange of the control retainer and a flange of the rotary retainer, the control retainer and the rotary retainer rotate relative to each other in the direction in which the circumferential widths of the respective pockets decrease, so that the pairs of rollers are moved to their disengaged position by the pillars of the control retainer and the respective pillars of the rotary retainer, thereby stopping the transmission of the rotation of the inner ring to the outer ring.

In the above rotation transmission device, when the electromagnetic coil of the electromagnetic clutch is de-energized, due to the pressing force of the elastic members received between the respective opposed pairs of rollers, the control retainer and the rotary retainer rotate relative to each other in the direction in which the circumferential widths of the respective pockets increase, so that the pairs of rollers instantly engage with the cylindrical surface and the respective cam surfaces. Therefore, the rollers scarcely move in the rotational direction, and can respond quickly.

Problems to be Solved by the Invention

In the above rotation transmission device, since the rollers engage when the control retainer axially moves, and the control retainer axially moves when the rollers disengage, an axial force is applied from the pillars of the control retainer to the respective rollers kept in contact with the pillars of the control retainer. This might cause these rollers to axially move on the respective cam surfaces, so that the two-way clutch might fail to function properly.

In order to prevent such an movement of rollers, in the rotation transmission device disclosed in Japanese Unexamined Patent Application Publication No. 2013-199993, a spring holder is fitted on an input shaft such that the spring holder is rotationally fixed to the input shaft and axially positioned, and rollers are prevented from axially moving by anti-movement pieces formed on the outer periphery of the spring holder and a washer fitted on an end portion of the input shaft.

In the above rotation transmission device, flat surface portions are formed on the outer periphery of a cylindrical, holder fitting surface of the input shaft, engagement surfaces are formed on the inner periphery of the spring holder so as to be opposed to the respective flat surface portions of the holder fitting surface, and the engagement surfaces of the spring holder are engaged with the respective flat surface portions of the holder fitting surface such that the spring holder is rotationally fixed. Since machining by end mill is necessary so as to form such flat surface portions, machining costs are high. In order to reduce such machining costs, it was necessary to take a measure.

Also, a snap ring groove is formed in the holder fitting surface and a snap ring is attached in the snap ring groove so as to axially position the spring holder. However, due to the presence of the above flat surface portions, the snap ring groove cannot extend to or exist in the flat surface portions. Therefore, the attachment of the snap ring is unstable, and when assembled, if other components abut separated ends of the snap ring, the snap ring may be detached from the snap ring groove.

SUMMARY OF THE INVENTION

It is an object of the present invention to reduce machining costs in a rotation transmission device including a two-way clutch configured to selectively perform and stop the transmission of the rotation of an input shaft to an output shaft, and an electromagnetic clutch configured to selectively engage and disengage the two-way clutch.

Means for Solving the Problems

In order to achieve the above object, the present invention provides a rotation transmission device comprising: a two-way clutch configured to selectively perform and stop transmission of torque between an input shaft and an output shaft arranged coaxially with the input shaft; and an electromagnetic clutch including an electromagnet, and configured to selectively engage and disengage the two-way clutch, wherein the two-way clutch comprises: an outer ring provided at an end portion of the output shaft; an inner ring provided at an end portion of the input shaft; a control retainer having pillars; and a rotary retainer having pillars; wherein the pillars of the control retainer and the pillars of the rotary retainer are arranged between an inner periphery of the outer ring and an outer periphery of the inner ring such that the pillars of the control retainer circumferentially alternate with the pillars of the rotary retainer; wherein pockets are defined between adjacent ones of the pillars of the control retainer and the pillars of the rotary retainer, wherein the two-way clutch further comprises: a plurality of pairs of rollers, each pair being mounted in each of the pockets so as to be engageable with a cylindrical surface formed on the inner periphery of the outer ring and each of cam surfaces formed on the outer periphery of the inner ring; and elastic members each mounted in each of the pockets and biasing the corresponding pair of rollers in a direction away from each other, wherein the rotation transmission device further comprises a spring holder for restricting an axial movement of the rollers, the spring holder being fitted on the input shaft and abutting one of two axial end surfaces of the inner ring so as to be rotationally fixed and axially positioned, wherein the spring holder is formed on an outer periphery of the spring holder with a plurality of spring holding pieces extending to overhang the respective elastic members, and wherein the rotation transmission device is configured such that when the electromagnet of the electromagnetic clutch is energized, and the control retainer axially moves, the control retainer and the rotary retainer rotate relative to each other in a direction in which circumferential widths of the respective pockets decrease, so that the rollers are disengaged from the inner periphery of the outer ring and the outer periphery of the inner ring, characterized in that at least one of the spring holding pieces is formed with an engagement surface engaging with one of the cam surfaces of the inner ring such that the spring holder is rotationally fixed.

As described above, by forming the engagement surface on at least one of the spring holding pieces formed on the outer periphery of the spring holder, and engaging this engagement surface with one of the cam surfaces of the outer periphery of the inner ring, the spring holder can be rotationally fixed, it is not necessary to form, on a holder fitting surface formed on the input shaft, flat surface portions for rotationally fixing the spring holder.

In the arrangement in which a snap ring groove is formed in the holder fitting surface, and a snap ring is attached in the snap ring groove so as to axially position the spring holder, since no flat surface portions are formed on the holder fitting surface, it is possible to form the snap ring groove as an annular groove having no circumferentially separate portions, and thus to stably and firmly attach the snap ring in the snap ring groove.

In the arrangement in which the spring holder is provided on the outer periphery of the spring holder with a plurality of extension arms axially extending along an outer peripheral surface of the inner ring, and the extension arms have, respectively, distal ends engaged with the other of the two axial end surfaces of the inner ring so as to restrict an axial movement of the spring holder, a snap ring can be dispensed with or omitted so that a snap spring groove does not need to be formed, thus making it possible to further reduce costs.

The rotation transmission device may be configured such that the distal ends of the respective extension arms comprise engagement claws engaged with the other of the two axial end surfaces of the inner ring, such that the distal ends of the respective extension arms comprise bent portions engaged, by snap fitting, with the other of the two axial end surfaces of the inner ring, or such that the distal ends of the respective extension arms comprise crimped pieces formed by crimping the distal ends, and engaged with the other of the two axial end surfaces of the inner ring.

Effects of the Invention

In the present invention, as described above, by forming the engagement surface on at least one of the spring holding pieces formed on the outer periphery of the spring holder, and engaging this engagement surface with one of the cam surfaces of the inner ring such that the spring holder is rotationally fixed, it is not necessary to form, on a holder fitting surface formed on a conventional input shaft, flat surface portions for rotationally fixing the spring holder. Therefore, it is possible to reduce costs.

BEST MODE FOR CARRYING OUT THE INVENTION

Figure 1:
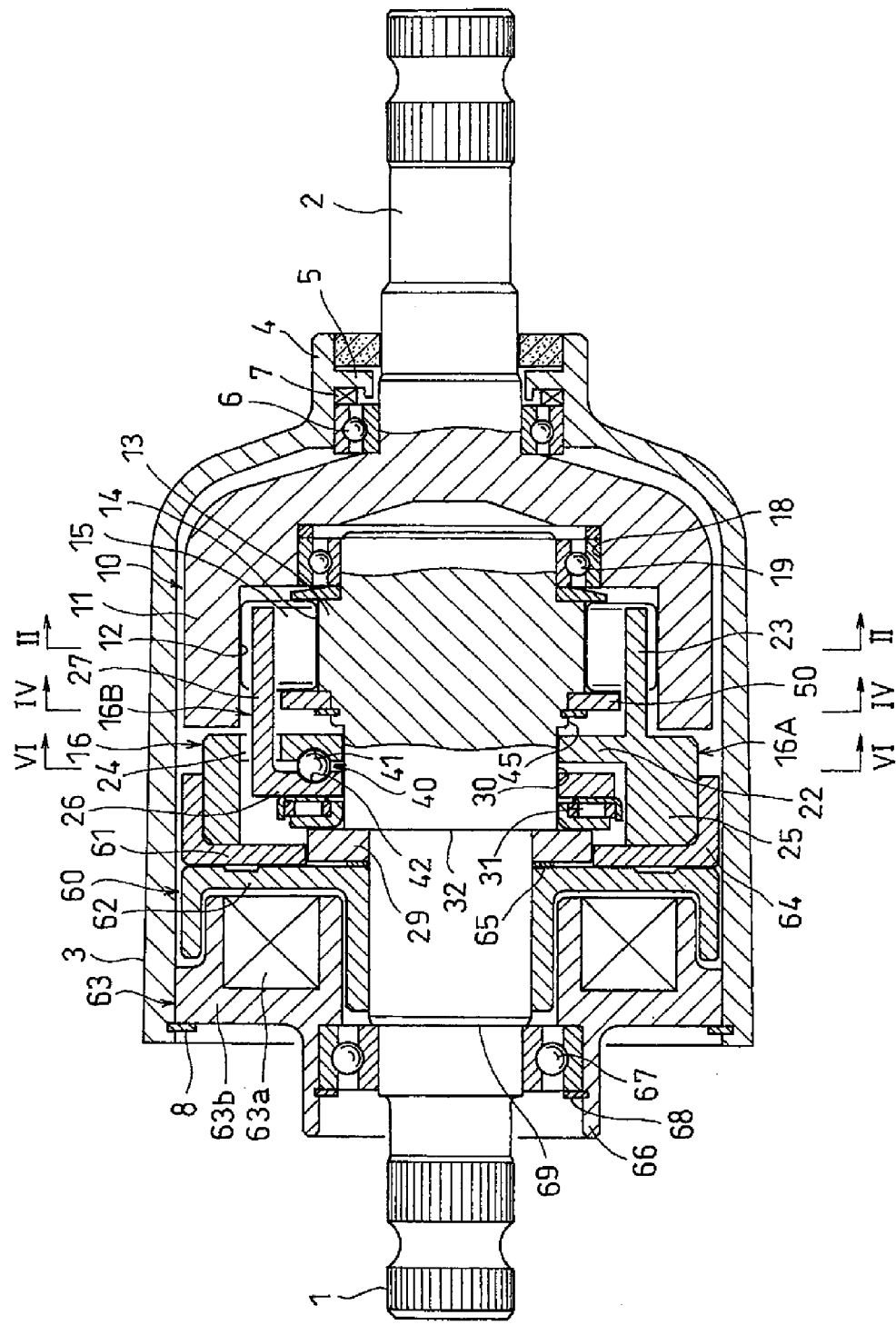
FIG. 1 is a longitudinal sectional view of a rotation transmission device according to an embodiment of the present invention.

The embodiment of the present invention is now described with reference to the drawings. FIG. 1 illustrates a rotation transmission device according to the embodiment of the present invention. As illustrated in FIG. 1, this rotation transmission device includes an input shaft 1, an output shaft 2 arranged coaxially with the input shaft 1, a housing 3 covering end portions of the input shaft 1 and the output shaft 2, a two-way clutch 10 provided in the housing 3, and configured to selectively perform and stop the transmission of the rotation of the input shaft 1 to the output shaft 2, and an electromagnetic clutch 60 configured to selectively engage and disengage the two-way clutch 10.

Figure 2:
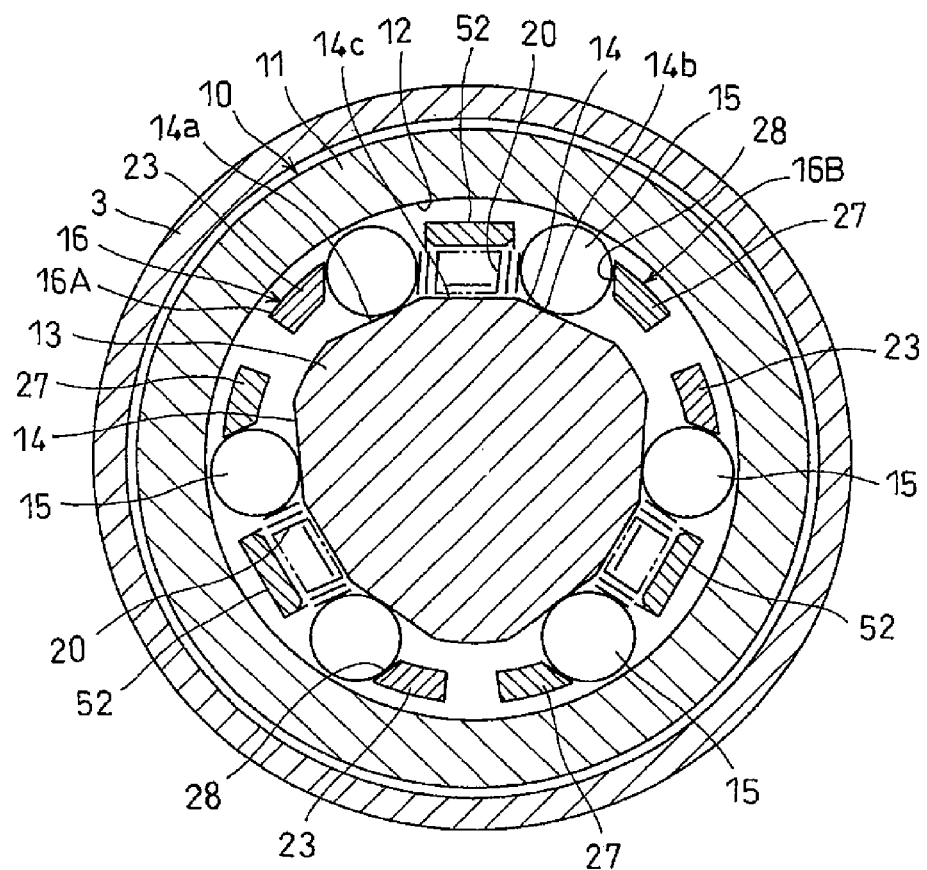
FIG. 2 is a sectional view taken along line II-II of FIG. 1.
Figure 3:
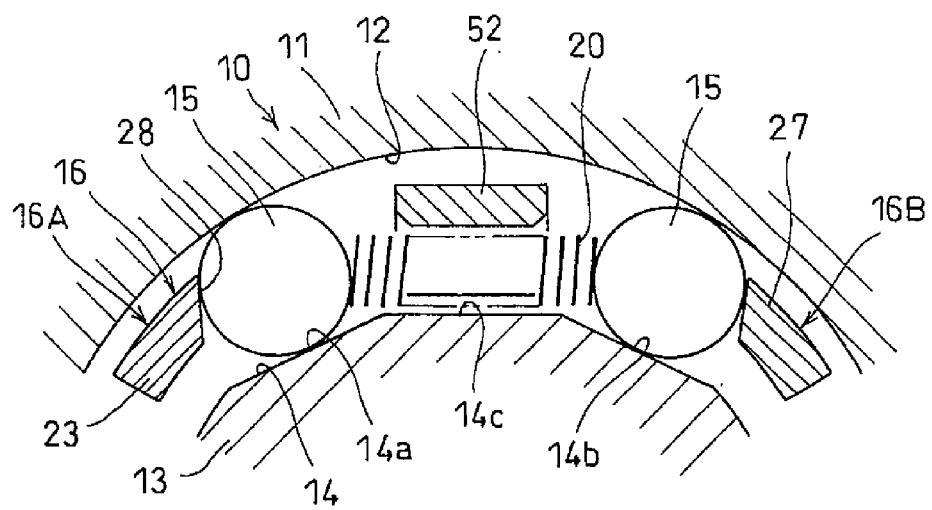
FIG. 3 is a sectional view illustrating the state in which rollers of a two-way clutch are engaged.

As illustrated in FIGS. 1 to 3, the two-way clutch 10 includes an outer ring 11 provided at the end portion of the output shaft 2 and formed on the inner periphery of the outer ring 11 with a cylindrical surface 12, an inner ring 13 provided at the end portion of the input shaft 1 and formed on the outer periphery of the inner ring 13 with a plurality of cam surfaces 14 circumferentially equidistantly spaced apart from each other, an opposed pair of rollers 15 and an elastic member 20 which are arranged between each cam surface 14 and the cylindrical surface 12, and a retainer assembly 16 retaining the rollers 15. With this arrangement, when the inner ring 13 rotates in one direction, one of each pair of rollers 15 engages with the cylindrical surface 12 and the corresponding cam surface 14, thereby transmitting the rotation of the inner ring 13 to the outer ring 11, and when the inner ring 13 rotates in the other direction, the other of each pair of rollers 15 engages with the cylindrical surface 12 and the corresponding cam surface 14, thereby transmitting the rotation of the inner ring 13 to the outer ring 11.

The housing 3 has a cylindrical shape, and is formed at one end thereof with a small diameter bearing tube 4. The bearing tube 4 is formed on its inner periphery with a positioning ring 5. A bearing 6 is provided on the inner side of the positioning ring 5 so as to rotatably support the output shaft 2. An elastic member 7 is provided between the bearing 6 and the positioning ring 5.

The elastic member 7 biases the two-way clutch 10 and the electromagnetic clutch 60, configured to selectively engage and disengage the two-way clutch 10, toward an anti-separation ring 8 comprising a snap ring attached to the inner periphery of the housing 3 near its opening at the other end of the housing 3, thereby pressing the electromagnetic clutch 60 against the anti-separation ring 8. Therefore, the components built in the housing 3 and comprising the two-way clutch 10 and the electromagnetic clutch 60 are mounted in the housing 3 so as to be immovable relative to each other.

As illustrated in FIG. 1, a small diameter recess 18 is formed in the inner surface of the closed end portion of the outer ring 11, and the end portion of the input shaft 1 is rotatably supported by a bearing 19 mounted in the recess 18.

Though the inner ring 13 is integral with the end portion of the input shaft 1 in FIG. 1, the inner ring 13 and the input shaft 1 may be separate members. In this case, the end portion of the input shaft 1 is fitted in the inner ring 13, and the inner ring 13 and the input shaft 1 are fixedly coupled together by serrations formed between their fitting surfaces.

As illustrated in FIG. 3, the cam surfaces 14, formed on the outer periphery of the inner ring 13, are each constituted by a pair of slope surface portions 14a and 14b sloping in opposite directions to each other, and a flat, spring supporting surface portion 14c formed between the pair of slope surface portions 14a and 14b. Each cam surface 14 defines a wedge-shaped space between the cam surface 14 and the cylindrical surface 12 of the outer ring 11, the space narrowing toward the respective circumferential ends of the space.

The spring supporting surface portions 14c extend in the tangential directions of the inner ring 13, and support the respective elastic members 20.

The elastic members 20 are arranged between the respective pairs of rollers 15 so as to be supported by/on the respective spring supporting surface portions 14c. Each pair of rollers 15 are biased away from each other by the elastic member 20.

As illustrated in FIGS. 1 and 2, the retainer assembly 16 is constituted by a control retainer 16A and a rotary retainer 16B. The control retainer 16A includes an annular flange 22, and pillars 23 equal in number to the cam surfaces 14 and extending from the outer peripheral portion of one surface of the flange 22, the pillars 23 being circumferentially equidistantly spaced apart from each other. The annular flange 22 is formed with circular arc-shaped elongated holes 24 between the respective adjacent pairs of pillars 23. The control retainer 16A further includes a tubular portion 25 extending from the outer periphery of the flange 22 in the direction opposite to the direction in which the pillars 23 extend.

The rotary retainer 16B includes an annular flange 26, and pillars 27 equal in number to the cam surfaces 14 and extending from the outer periphery of the flange 26, the pillars 27 being circumferentially equidistantly spaced apart from each other.

As illustrated in FIGS. 1 and 2, the control retainer 16A and the rotary retainer 16 B are combined together by inserting the pillars 27 of the rotary retainer 16B through the respective elongated holes 24 of the control retainer 16A such that the pillars 23 circumferentially alternate with the pillars 27. With the retainers 16A and 16B combined together in this way, the distal end portions of the pillars 23 and 27 are arranged between the outer ring 11 and the inner ring 13, and the flange 22 of the control retainer 16A and the flange 26 of the rotary retainer 16B are arranged between the outer ring 11 and a support ring 29 fitted on the outer periphery of the input shaft 1.

By combining the retainers 16A and 16B together as described above, as illustrated in FIG. 3, pockets 28 are defined between the pillars 23 of the control retainer 16A and the corresponding pillars 27 of the rotary retainer 16B so as to be radially opposed to the respective cam surfaces 14 of the inner ring 13. One pair of the opposed pairs of rollers 15 and one of the elastic members 20 are received in each pocket 28.

As illustrated in FIG. 1, the flange 22 of the control retainer 16A is supported by/on a cylindrical slide guide surface 30 formed on the outer periphery of the input shaft 1 so as to be slidable along the slide guide surface 30. A thrust bearing 31 is mounted between the flange 26 of the rotary retainer 16B and the support ring 29, which is fitted on the input shaft 1.

The thrust bearing 31 rotatably supports the rotary retainer 16B, while preventing the rotary retainer 16B from moving toward the electromagnetic clutch 60.

Figure 6:
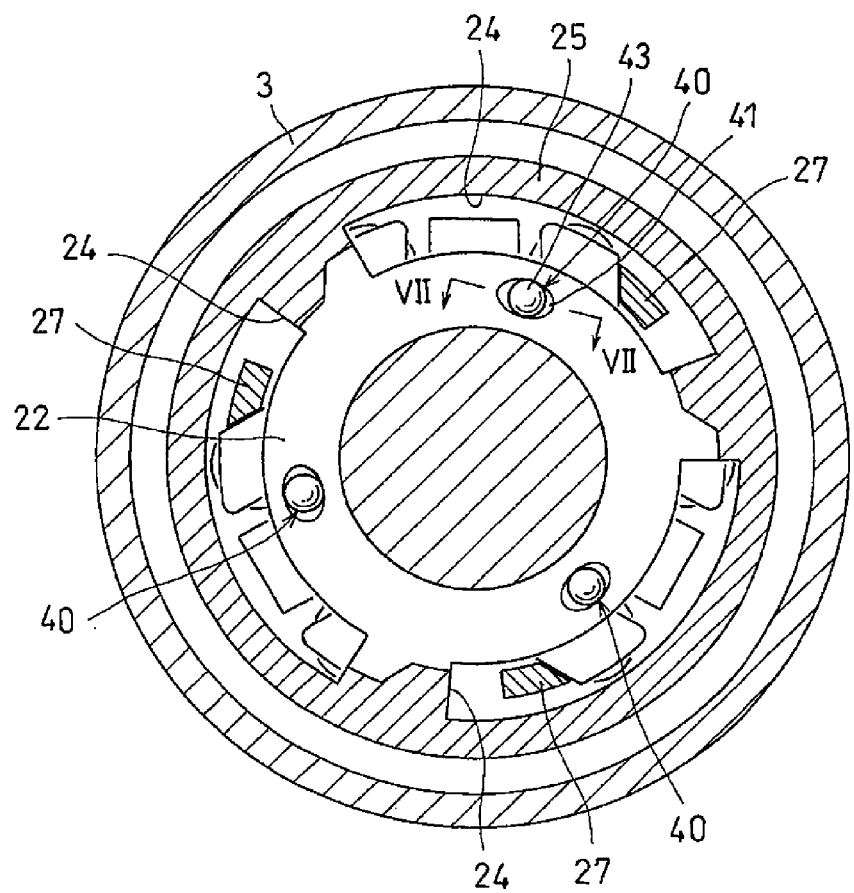
FIG. 6 is a sectional view taken along line VI-VI of FIG. 1.

As illustrated in FIGS. 2 and 6, a torque cam 40, which constitutes a motion converting mechanism, is provided between the flange 22 of the control retainer 16A and the flange 26 of the rotary retainer 16B so as to convert the axial movement/motion of the control retainer 16A into the relative rotary motion between the control retainer 16A and the rotary retainer 16B.

Figure 7A:
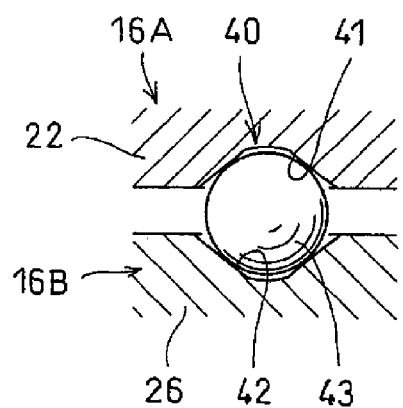
FIG. 7(a) is a sectional view taken along line VII-VII of FIG. 6.
Figure 7B:
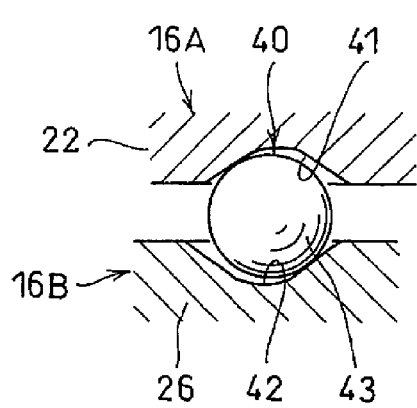
FIG. 7(b) is a sectional view illustrating the state in which a torque cam is not in operation yet.

As illustrated in FIGS. 7(a) and 7(b), the torque cam 40 includes opposed pairs of cam grooves 41 and 42 formed in the respective opposed surfaces of the flange 22 of the control retainer 16A and the flange 26 of the rotary retainer 16B. Each cam groove 41, 42 is deepest at the circumferential center of the groove, and the depth of the groove gradually decreases toward the respective circumferential ends of the groove. The torque cam 40 further includes balls 43 received between the cam grooves 41 and the respective cam grooves 42.

Though the cam grooves 41 and 42 are circular arc-shaped in this embodiment, the cam grooves may be V-shaped.

The torque cam 40 is configured such that when the control retainer 16A moves in the axial direction in which the flange 22 of the control retainer 16A approaches the flange 26 of the rotary retainer 16B, as illustrated in FIG. 7(a), the balls 43 roll to move toward the deepest portions of the respective opposed pairs of cam grooves 41 and 42, thereby rotating the control retainer 16A and the rotary retainer 16B relative to each other in the direction in which the circumferential widths of the respective pockets 28 decrease.

Figure 5:
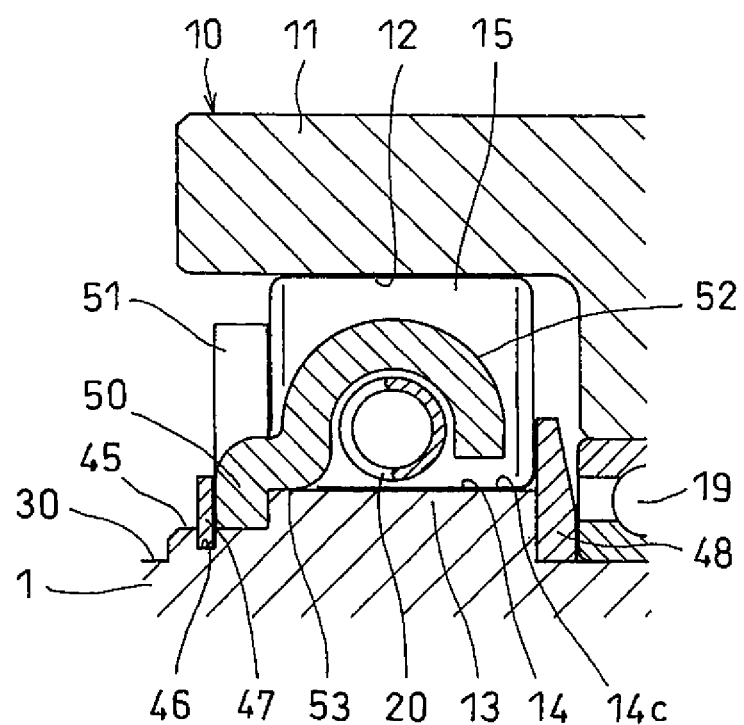
FIG. 5 is a sectional view taken along line V-V of FIG. 4.

As illustrated in FIGS. 2 and 5, the input shaft 1 has a cylindrical, holder fitting surface 45 formed at the intersection between the slide guide surface 30 and one of the two axial end surfaces of the inner ring 13 and having a diameter larger than that of the slide guide surface 30. A spring holder 50 is fitted on the holder fitting surface 45.

As illustrated in FIG. 5, a snap ring groove 46 is formed in the holder fitting surface 45, and a snap ring 47 fitted in the snap ring groove 46 and the one axial end surface of the inner ring 13 axially position the spring holder 50 such that the spring holder 50 is axially unmovable.

Figure 4:
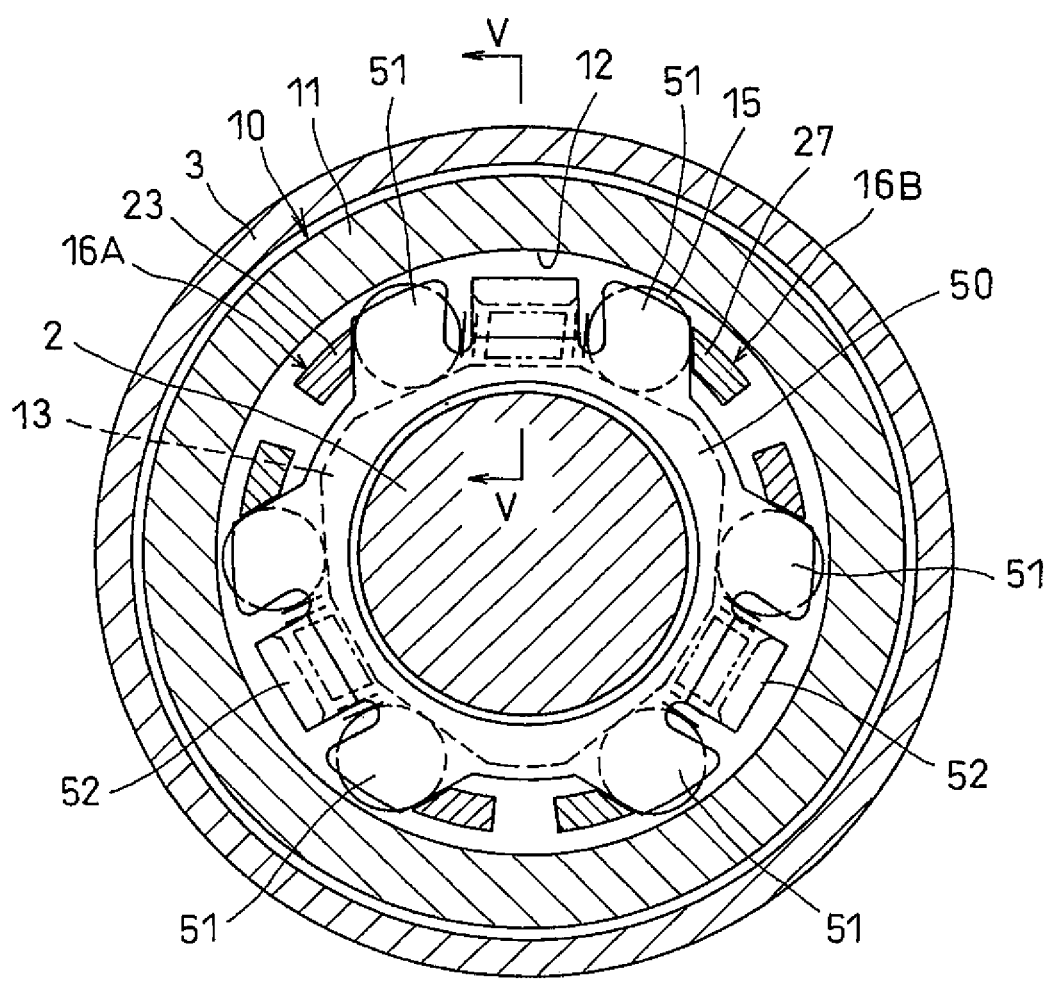
FIG. 4 is a sectional view taken along line IV-IV of FIG. 1.

As illustrated in FIGS. 4 and 5, the spring holder 50 is formed by pressing a metal plate, and is provided on its outer periphery with stopper pieces 51 corresponding to the respective rollers 15 of the two-way clutch 10. The stopper pieces 51 and a washer 48 fitted on the end portion of the input shaft 1 prevent the rollers 15 from moving in the axial direction.

The stopper pieces 51 are provided in a plurality of pairs, with each pair arranged between one of the pillars 23 of the control retainer 16A and the corresponding one of the pillars 27 of the rotary retainer 16B, and configured such that when the control retainer 16A and the rotary retainer 16B rotate relative to each other in the direction in which the circumferential widths of the respective pockets 28 decrease, the pairs of stopper pieces 51 receive, on the respective outer side edges thereof, the pillars 23 of the control retainer 16A and the pillars 27 of the rotary retainer 16B, thereby keeping the opposed pairs of rollers 15 in their neutral position.

In this embodiment, as described above, the stopper pieces 51 have a function for restricting the rotation angle of the control retainer 16A and the rotary retainer 16B. However, a rotation angle restricting means may be separately provided.

The spring holder 50 is provided on its outer peripheral portion with spring holding pieces 52 arranged between the respective pairs of stopper pieces 51, and axially extending to overhang the outer periphery of the inner ring 13.

The spring holding pieces 52 are U-shaped so as to surround the outer peripheral portions of the respective elastic members 20, and thus prevent the elastic members 20 from moving/escaping radially outwardly from the spaces between the respective pairs of rollers 15. Each spring holding piece 52 is formed at its root with an engagement surface 53 engaging with the spring supporting surface portion 14c, which constitutes a portion of the cam surface 14. Due to the engagement of the engagement surfaces 53 with the respective spring supporting surface portion 14c, the spring holder 50 is rotationally fixed to the input shaft 1.

As illustrated in FIG. 1, the electromagnetic clutch 60 includes an armature 61 axially opposed to the end surface of the tubular portion 25 of the control retainer 16A, a rotor 62 axially opposed to the armature 61, and an electromagnet 63 axially opposed to the rotor 62.

The armature 61 is fitted on the outer periphery of the support ring 29, and rotatably and slidably supported by the support ring 29. The tubular portion 25 of the control retainer 16A is press-fitted to a coupling tube 64 provided on the outer peripheral portion of the armature 61, so that the control retainer 16A and the armature 61 are fixedly coupled to each other. Due to this coupling, the armature 61 is slidably supported by two surfaces separately arranged in the axial direction, specifically, by the cylindrical outer diameter surface of the support ring 29 and the slide guide surface 30 of the outer periphery of the input shaft 1.

The rotor 62 is press-fitted on the input shaft 1, and positioned by the support ring 29, fitted on the input shaft 1, and a spacer 65 mounted between the support ring 29 and the rotor 62.

The support ring 29 has a rectangular section, and is axially positioned by a step 32 formed on the other axial end of the slide guide surface 30 of the input shaft 1.

The electromagnet 63 is constituted by an electromagnetic coil 63a, and a core 63b supporting the electromagnetic coil 63a. The core 63b is formed on its outer side end surface with a tubular portion 66 in which is mounted a bearing 67 which is prevented from moving out of the tubular portion 66 by a snap ring 68 attached to the inner periphery of the tubular portion 66.

The bearing 67 is axially positioned by the snap ring 68 and a step 69 formed on the outer diameter surface of the input shat 1. Due to the bearing 67, the electromagnet 63 and the input shaft 1 are rotatable relative to each other.

The rotation transmission device of the embodiment is configured as described above. While the electromagnetic coil 63a of the electromagnetic clutch 60 illustrated in FIG. 1 is de-energized, as illustrated in FIG. 3, the pairs of rollers 15 of the two-way clutch 10 are in engagement with the cylindrical surface 12 of the outer ring 11 and the respective cam surfaces 14 of the inner ring 13.

Therefore, when the input shaft 1 rotates in one direction, this rotation is transmitted from the inner ring 13 to the outer ring 11 through one of each opposed pair of rollers 15, so that the output shaft 2 rotates in the same direction as the input shaft 1. When the input shaft 1 rotates in the other/opposite direction, this rotation is transmitted to the output shaft 2 through the other of each opposed pair of rollers 15.

With the two-way clutch 10 engaged, when the electromagnetic coil 63a of the electromagnetic clutch 60 is energized, an attraction force is applied to the armature 61, so that the armature 61 axially moves until the armature 61 is attracted to the rotor 62.

At this time, since the armature 61 and the control retainer 16A are fixedly coupled to each other due to the fitting of the tubular portion 25 in the coupling tube 64, when the armature 61 axially moves toward the rotor 62, the control retainer 16A moves in the direction in which the flange 22 of the control retainer 16A approaches the flange 26 of the rotary retainer 16B.

Due to the relative movement of the control and rotary retainers 16A and 16B, the balls 43 roll to move from the position illustrated in FIG. 7(b) to the position illustrated in FIG. 7(a), specifically, to the deepest portions of the respective opposed pairs of cam grooves 41 and 42, so that the control retainer 16A and the rotary retainer 16B rotate relative to each other in the direction in which the circumferential widths of the respective pockets 28 decrease.

Due to the relative rotation of the control retainer 16A and the rotary retainer 16B, each opposed pair of rollers 15 illustrated in FIG. 3 are pushed by the pillar 23 of the control retainer 16A and by the pillar 27 of the rotary retainer 16B so as to approach each other.

As a result thereof, as illustrated in FIG. 2, the rollers 15 move to the neutral position in which the pairs of rollers 15 are not engaged with the cylindrical surface 12 and the respective cam surfaces 14, thereby disengaging the two-way clutch 10.

With the two-way clutch 10 disengaged, when torque is applied to the input shaft 1 so as to rotate the input shaft 1 in one direction, since the stopper pieces 51 of the spring holder 50 push either the pillars 23 of the control retainer 16A or the pillars 27 of the rotary retainer 16B, the control retainer 16A and the rotary retainer 16B rotate together with the input shaft 1. At this time, since the rollers 15 are kept in the neutral position in which the rollers 15 are disengaged, the rotation of the input shaft 1 is not transmitted to the outer ring 11, so that the input shaft 1 rotates freely/alone.

When the control retainer 16A and the rotary retainer 16B rotate relative to each other in the direction in which the circumferential widths of the respective pockets 28 decrease, each pillar 23 of the control retainer 16A abuts the outer side edge of one of each pair of stopper pieces 51, and each pillar 27 of the rotary retainer 16B abuts the outer side edge of the other of each pair of stopper pieces 51, thereby restricting the relative rotation between the control and rotary retainers 16A and 16B.

Therefore, the elastic members 20 are not contracted more than necessary, so that the breakage of the elastic members 20 due to fatigue can be prevented even if the elastic members 20 are repeatedly contracted and expanded.

With the input shaft 1 rotating freely/alone, when the electromagnetic coil 63a is de-energized, the attraction force applied to the armature 61 disappears, and thus the armature 61 becomes rotatable. As a result thereof, due to the pressing force of the elastic members 20, the control retainer 16A and the rotary retainer 16B rotate relative to each other in the direction in which the circumferential widths of the respective pockets 28 increase, so that the rollers 15 move to the standby position at which the opposed pairs of rollers 15 engage with the cylindrical surface 12 and the respective cam surfaces 14 as illustrated in FIG. 3, and thus the rotation of the input shaft 1 is transmitted to the output shaft 2 through one of each opposed pair of the rollers 15.

In this state, when the input shaft 1 is stopped and then rotated in the opposite direction, the rotation of the input shaft 1 is transmitted to the output shaft 2 through the other of each opposed pair of the rollers 15.

As described above, when the electromagnetic coil 63a is de-energized, the control retainer 16A and the rotary retainer 16B rotate relative to each other in the direction in which the circumferential widths of the respective pockets 28 increase, so that the rollers 15 move to the standby position at which the opposed pairs of rollers 15 can instantly become wedged between the cylindrical surface 12 and the respective cam surfaces 14. Therefore, the rollers 15 scarcely move in the rotational direction when the two-way clutch engages, and the rotation of the inner ring 13 can be instantly transmitted to the outer ring 11.

Since torque is transmitted from the input shaft 1 to the output shaft 2 through rollers 15 that are equal in number to the cam surfaces 14, it is possible to transmit large torque from the input shaft 1 to the output shaft 2.

As illustrated in FIG. 5, by forming the engaging surfaces 53 on the respective spring holding pieces 52, provided on the outer periphery of the spring holder 50, so as to engage with the spring supporting surface portions 14c of the cam surfaces 14 of the inner ring 13 such that the spring holder 50 is rotationally fixed, it is not necessary at all to machine the portion of the holder fitting surface 45 on which the spring holder 50 is fitted. Therefore, it is possible to reduce machining costs, compared to forming, on the holder fitting surface 45, flat surface portions for rotationally fixing the spring holder 50.

Also, if flat surface portions for rotationally fixing the spring holder 50 are formed on the holder fitting surface 45, the snap ring groove 46 formed in such a holder fitting surface 45 will be circumferentially separated by the flat surface portions. However, since the spring holding pieces 52 are actually formed with the respective engagement surfaces 53 for rotationally fixing the spring holder 50, it is possible to form the holder fitting surface 45 as a cylindrical surface. Therefore, it is possible to form the snap ring groove 46, in the cylindrical, holder fitting surface 45, as an annular groove having no circumferentially separated portions, and thus to stably and firmly attach the snap ring 47 in the annular, snap ring groove 46.

Figure 8:
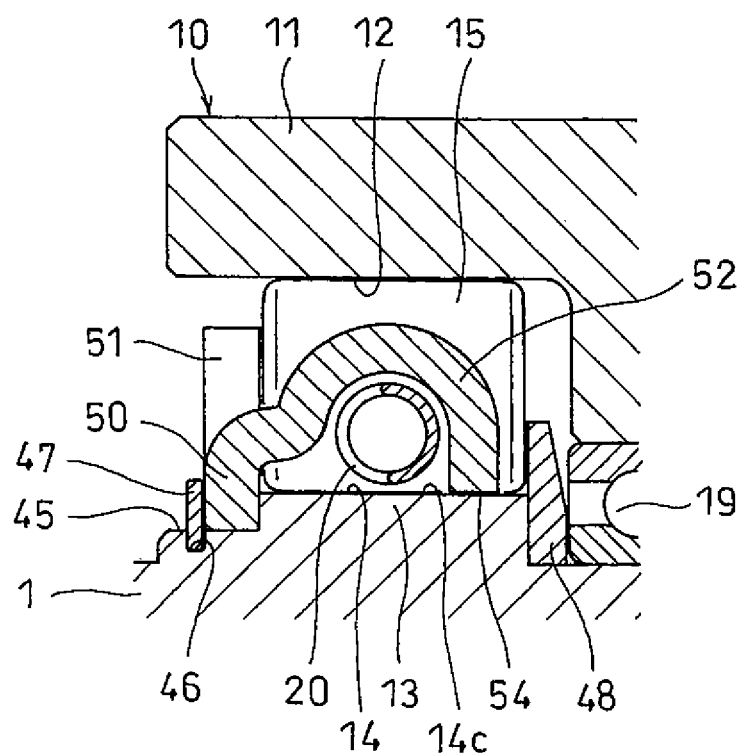
FIG. 8 is a sectional view illustrating a different means for rotationally fixing a spring holder.

In FIG. 5, the spring holding piece 52 are formed at their respective roots with the engagement surfaces 53, which engage with the spring supporting surface portions 14c of the cam surfaces 14 such that the spring holder 50 is rotationally fixed. However, as illustrated in FIG. 8, the spring holding pieces 52 may be formed at their respective distal ends with engagement surfaces 54 which engage with the spring supporting surface portions 14c such that the spring holder 50 is rotationally fixed.

Figure 9:
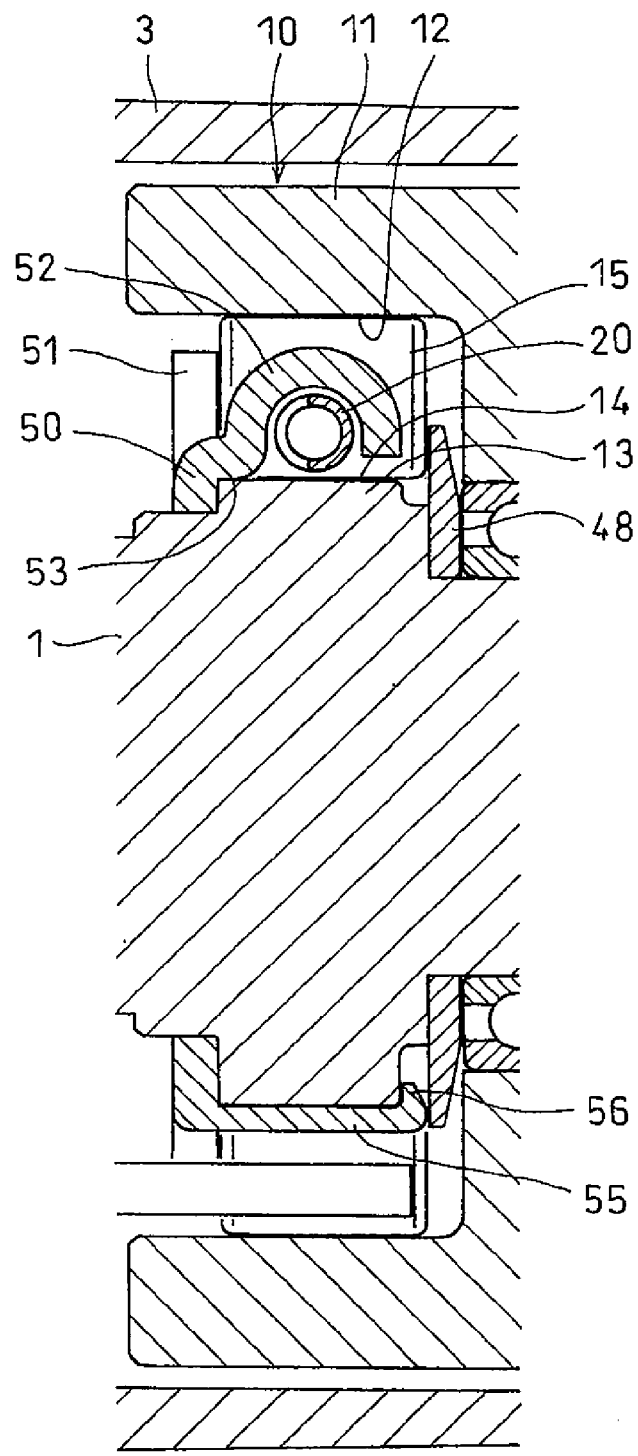
FIG. 9 is a sectional view of a different spring holder.
Figure 10:
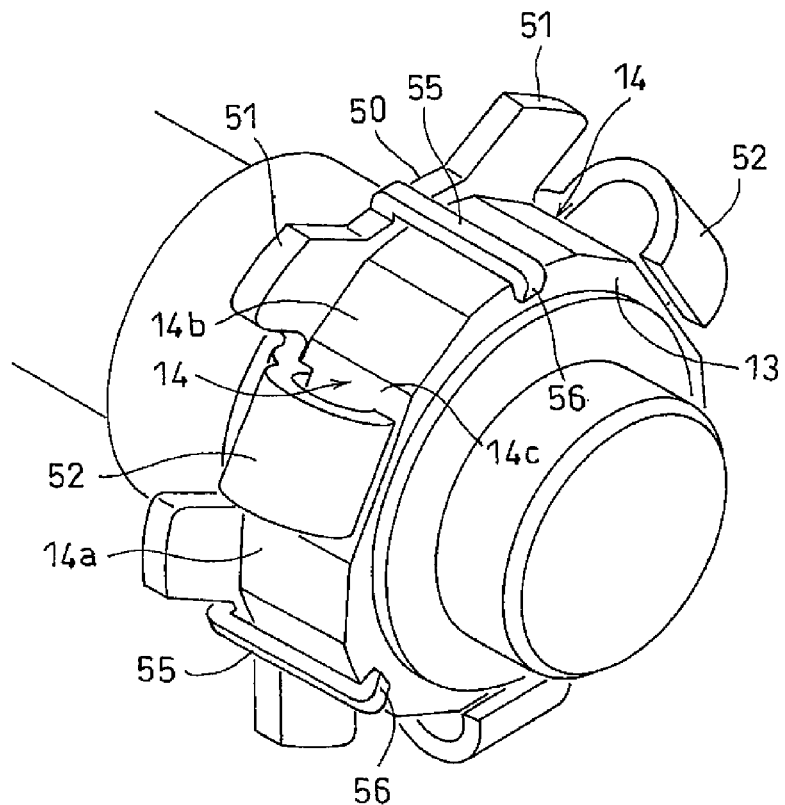
FIG. 10 is a perspective view illustrating the portion of an input shaft to which the spring holder of FIG. 9 is mounted.

In FIGS. 9 and 10, the spring holder 50 is provided on its outer periphery with a plurality of extension arms 55 which axially extend along the respective outer peripheral surface portions of the inner ring 13 defined between adjacent ones of the cam surfaces 14 of the inner ring 13, and which have, at the distal ends of the respective extension arms 55, engagement claws 56 engaging with the other of the two axial end surfaces of the inner ring 13, thereby restricting the axial movement of the spring holder 50. In this arrangement, the snap ring 47 illustrated in FIGS. 5 and 8 can be dispensed with or omitted so that the snap ring groove 46 does not need to be formed, thus making it possible to further reduce costs.

Figure 11A:
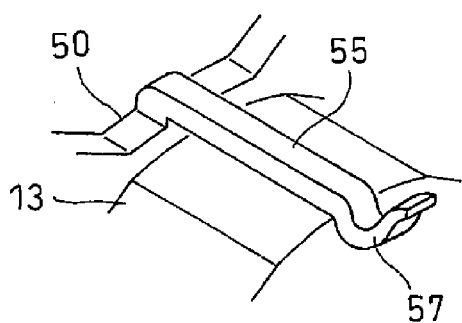
FIG. 11(a) is a perspective view illustrating a different means for positioning a spring holder.
Figure 11B:
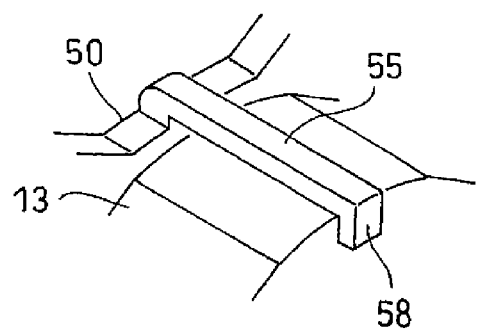
FIG. 11(b) is a perspective view illustrating a different means for positioning a spring holder.

As illustrated in FIG. 11(a), the extension arms 55 may be formed at their respective distal ends with, instead of the engagement claws 56, inwardly bent portions 57 such that the spring holder 50 is axially positioned by engaging the bent portions 57 with the other axial end surface of the inner ring 13. Alternatively, as illustrated in FIG. 11(b), the distal ends of the respective extension arms 55 may be crimped inwardly, and crimped pieces 58 formed by such crimping may be engaged with the other axial end surface of the inner ring 13 such that the spring holder 50 is axially positioned.

DESCRIPTION OF REFERENCE NUMERALS

1: input shaft
2: output shaft
10: two-way clutch
11: outer ring
13: inner ring
14: cam surface
15: roller
16A: control retainer
16B: rotary retainer
20: elastic member
23: pillar
27: pillar
28: pocket
50: spring holder
52: spring holding piece
53: engagement surface
54: engagement surface
55: extension arm
56: engagement claw
57: bent portion
58: crimped piece
60: electromagnetic clutch
63: electromagnet

The invention claimed is:

1. A rotation transmission device comprising:
a two-way clutch configured to selectively perform and stop transmission of torque between an input shaft and an output shaft arranged coaxially with the input shaft; and
an electromagnetic clutch including an electromagnet, and being configured to selectively engage and disengage the two-way clutch,
wherein the two-way clutch comprises:

an outer ring provided at an end portion of the output shaft;
an inner ring provided at an end portion of the input shaft;
a control retainer having pillars; and
a rotary retainer having pillars;
wherein the pillars of the control retainer and the pillars of the rotary retainer are arranged between an inner periphery of the outer ring and an outer periphery of the inner ring such that the pillars of the control retainer circumferentially alternate with the pillars of the rotary retainer;
wherein pockets are defined between adjacent ones of the pillars of the control retainer and the pillars of the rotary retainer,
wherein the two-way clutch further comprises:
a plurality of pairs of rollers, each pair of rollers being mounted in each of the pockets so as to be engageable with a cylindrical surface formed on the inner periphery of the outer ring and each of cam surfaces formed on the outer periphery of the inner ring; and
elastic members each mounted in each of the pockets and configured to bias the corresponding pair of rollers in a direction away from each other,
wherein the rotation transmission device further comprises a spring holder for restricting an axial movement of the rollers, the spring holder being fitted on the input shaft and abutting a first of two axial end surfaces of the inner ring so as to be rotationally fixed and axially positioned,
wherein an outer periphery of the spring holder is formed with a plurality of spring holding pieces extending to overhang the respective elastic members,
wherein the rotation transmission device is configured such that when the electromagnet of the electromagnetic clutch is energized, and the control retainer axially moves, the control retainer and the rotary retainer rotate relative to each other in a direction in which circumferential widths of the respective pockets decrease, so that the rollers are disengaged from the inner periphery of the outer ring and the outer periphery of the inner ring,
wherein at least one of the spring holding pieces is formed with an engagement surface engaging with one of the cam surfaces of the inner ring such that the spring holder is rotationally fixed,
wherein the outer periphery of the spring holder is provided with a plurality of extension arms axially extending along an outer peripheral surface of the inner ring,
wherein the extension arms have, respectively, distal ends engaged with a second of the two axial end surfaces of the inner ring so as to restrict an axial movement of the spring holder, and
wherein each of the spring holding pieces is circumferentially offset from each of the extension arms.

2. The rotation transmission device according to claim 1, wherein the distal ends of the respective extension arms comprise engagement claws engaged with the second of the two axial end surfaces of the inner ring, whereby the extension arms are in engagement with second other of the two axial end surfaces of the inner ring.

3. The rotation transmission device according to claim 1, wherein the distal ends of the respective extension arms comprise bent portions engaged, by snap fitting, with the second of the two axial end surfaces of the inner ring, whereby the extension arms are in engagement with the second of the two axial end surfaces of the inner ring.

4. The rotation transmission device according to claim 1, wherein the distal ends of the respective extension arms comprise crimped pieces formed by crimping the distal ends, and engaged with the second of the two axial end surfaces of the inner ring, whereby the extension arms are in engagement with the second of the two axial end surfaces of the inner ring.

* * * * *